Jan. 6, 1959   A. W. ROCKWELL, JR   2,866,988
LAST POSITIONING DEVICE FOR SHOE MACHINES
Filed Feb. 6, 1957
2 Sheets-Sheet 1
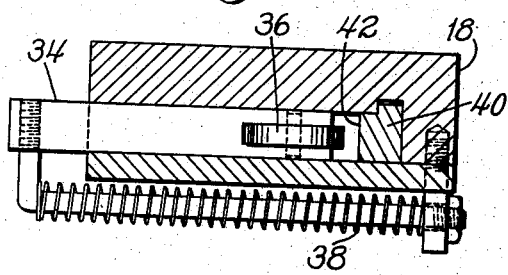
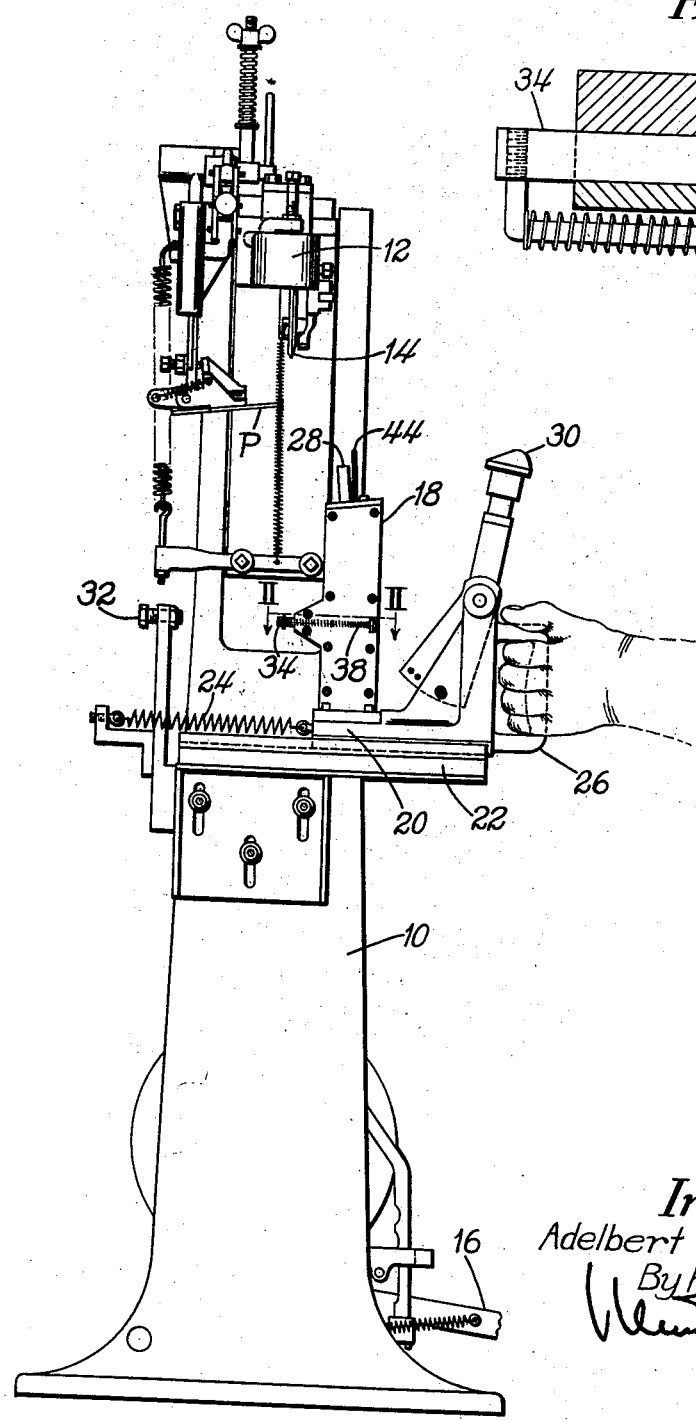
Inventor
Adelbert W. Rockwell, Jr.
By his Attorney

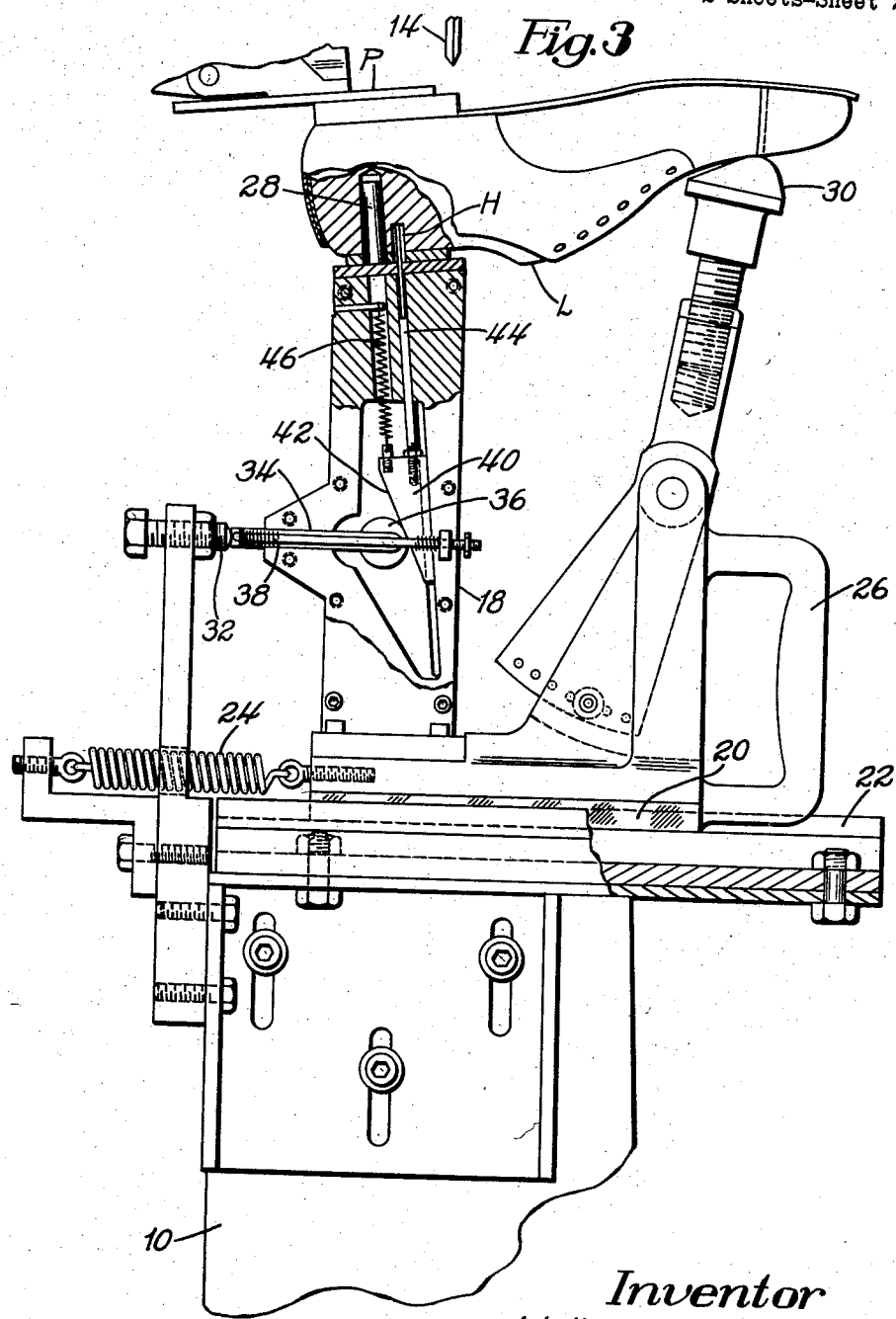

United States Patent Office 2,866,988
Patented Jan. 6, 1959

2,866,988

LAST POSITIONING DEVICE FOR SHOE MACHINES

Adelbert W. Rockwell, Jr., Beverly, Mass., assignor to United Shoe Machinery Corporation, Flemington, N. J., a corporation of New Jersey Application February 6, 1957, Serial No. 638,621

14 Claims. (Cl. 12—127)

This invention relates to shoe machines for performing an operation on shoe parts that are mounted on a last and are presented to the operating instrumentalities of the machine by a movable carriage upon which the last is operatively supported. In particular, the invention comprises a new and useful means for automatically controlling the degree of movement imparted to the carriage for presenting the shoe parts to the operating station in the machine, so that each last, regardless of its size, will be moved a determinable amount such that the particular shoe part will be presented in proper operative alinement with the machine tools.

When the same machine is employed for operating upon different sizes of shoe parts that are assembled on lasts of correspondingly different sizes, some means must be provided for adjusting the positions of successive lasts with respect to the operating location of the machine tools. In some instances it has been customary to centralize the operative location of the various lasts and, when a change in last size is encountered, to shift the operative position of the machine tools, thereby to bring the tools into operative alinement with the particular portion of the shoe parts that is to be operated upon. In other instances, where the operating instrumentalities are restricted to a fixed location in the machine, it has been customary operatively to adjust the position of each last as it is presented to the machine. Whichever mode of adjustment might be employed with a given machine, the machine operator was required first to know the size of the last that was about to be presented to the machine, and then manually to make the calibrated adjustments in accordance with that size. This requirement, that manual adjustments be made for each size change, not only demands constant attention and alertness on the part of the machine operator, but is time-consuming and introduces the potentiality for human error to cause the misfunctioning of the machine.

An object of the present invention is to provide a machine wherein the adjustments necessary to be made for operating upon lasts of various sizes require no time or attention on the part of the machine operator, and wherein automatic means establish the correct relative position of any last with respect to the operating instrumentalities of the machine.

Another object is to provide adjustment means, the settings of which are controlled by an intelligence sensing mechanism whose actuation is responsive to size information coded in tangible form on each last that is presented to the machine.

Although the lasts themselves do not, properly speaking, constitute a part of the machine of the present invention, the operative utility of the machine is dependent upon the employment of particular lasts having a unique feature that enables each last, as it is associated with the machine, to determine automatically the proper relative position of that last with respect to the operating instrumentalities of the machine. Accordingly, it may be said that the machine is adapted to be cooperatively associated with any of a series of lasts each of which lasts is provided with a drilled probe hole having a depth that may be probed by the machine and which depth bears a coded ratio to the size of the particular last. Whether the depth of the respective probe holes increases at a direct ratio as the size of the last increases, or whether the depth decreases at an inverse ratio to the increase in last size is of little or no consequence, provided the depth of each hole is uniformly graded in accordance with a suitable code scheme whereby the difference in the sizes of any two lasts of a series is uniformly proportionate to the variance in the depth of their probe holes. Accordingly a novel feature of this invention is that the machine is provided with a movable carriage for supporting a last and for uniformly presenting the last, regardless of size, in proper alinement with the operating instrumentalities of the machine.

Another feature of the invention is the provision of a shiftable abutment member for variably limiting the degree of operative movement that may be imparted to the carriage.

A further feature is the provision of last size sensing means associated with the carriage for shifting the position of the abutment in accordance with a tangible size index provided on each last.

Another feature is that the abutment member for limiting the degree of movement imparted to the carriage is a slidable wedge having an angular face portion interposed between a portion of the carriage and a fixed motion limiting stop member.

Still another novel feature of the invention is that the size sensing means is a probe finger movable concomitantly with the wedge and adapted to penetrate to the full depth of the probe hole in each last of a series of lasts wherein the depths of the respective probe holes are a tangible index indicating the size characteristic of each last.

The above and various other objects and features of the invention will now be described, in the following detailed description of an illustrative shoemaking machine embodying the invention, with reference to the accompanying drawings, and will be pointed out in the appended claims.

In the drawings,

Fig. 1 is a side elevation of a shoe machine, herein illustrated as a Heel Breasting machine, provided in accordance with the invention with mechanism for automatically presenting to the machine shoes to be operated upon;

Fig. 2 is an enlarged section, taken along the line II—II of Fig. 1 and viewed in the direction of the arrows, showing a detail of the illustrated mechanism; and Fig. 3 is an enlarged side elevation, partially broken away and in section, showing the mechanism with a lasted shoe associated therewith and operatively positioned in the machine.

The illustrated machine to which the mechanism of this invention has, by way of example, been applied is a shoe machine that is commonly known as a Heel Breasting machine, and is of the same general type as that disclosed in United States Letters Patent No. 1,068,423, issued July 29, 1913, in the name of Warren Frasier. Since the present invention is in no way limited in its application to the operation of heel breasting a shoe, it will suffice herein to state that in such a machine the operating instrumentality is a reciprocable knife mounted in a power operated breasting head which, when manually triggered by a treadle or other suitable means, imparts a vertical chopping stroke to the knife. When so actuated, the knife descends forcefully in guillotine fashion to breast the heel stock at whatever zone of the heel has been operatively positioned in the fixed path of the knife. Since in this machine, as in many others, there is a centralized operating station, the presentation of the shoe parts to the operating station must be adjustably controlled by regulating the movement of the shoe last toward the knife so that with each lasted shoe the same critical portion of the shoe will uniformly be presented regardless of variations in shoe size.

Referring to the drawings, the illustrative machine is provided with a frame 10 in the form of an upright column upon which an operating head 12 is supported. The operating tool, a knife 14, carried by the head, is cyclically operated in a vertical descending path each time a treadle release lever 16 is tripped by the machine operator.

According to the present invention the mechanism for locating the work with respect to the operative path of the knife 14 comprises a movable work supporting carriage 18 having a base 20 slidably supported at one side of the column 10 by a horizontal guideway 22 affixed to the machine frame. A tension spring 24, having one end attached to the base 20 and the opposite end secured to a stationary portion of the machine frame, tends normally to shift the work supporting carriage toward the path of the knife, or to the left from the last loading position as illustrated in Fig. 1, to an operative position as illustrated in Fig. 3. The carriage may be manually shifted toward the right to place it into the last loading position, and it may be held manually, against the force of the spring 24, by means of a handle 26. When held in said loading position, a last L, having a shoe to be operated upon, is placed upon a last supporting spindle 28 with the toe directed so as to be supported upon an adjustable toe rest 30 pivotally attached to the base 20 of the carriage. When the handle 26 is manually released, the degree of movement that may be imparted by the spring 24 of the shiftable carriage is determined by an adjustable abutment device carried by the carriage 18 and engageable with a fixed stop member 32 on the frame of the machine. This abutment device, which is partially housed within the carriage 18, comprises a horizontally slidable rod 34 having a free end extending beyond the main body of the carriage in a direction so as to be abuttingly engageable with the stop member 32, and having a roller 36 disposed at the opposite end as illustrated in Fig. 2. This rod and roller are normally resiliently urged, by a spring 38, toward the left in the direction of the fixed stop 32. However, when the carriage 18, under the urgency of the stronger spring 24, is allowed to move to the left and toward operative position, Fig. 3, the resulting engagement of the free end of the rod 34 against the stop 32 causes the spring 38 to yield as the rod 34 then is caused to slide inwardly with respect to the carriage until its relative movement is limited by the abutting engagement of the roller 36 with a motion limiting wedge 40 slidably mounted within the carriage for heightwise movement across the path of the roller 36, and having an inclined cam face 42 for progressively limiting the relative inward movement of the rod 34 in accordance with the heightwise adjustment of the wedge 40. A probe finger 44, affixed to the wedge 40 and extending upward through the top of the last supporting surface of the carriage 18, has a free end portion adjacent to and in axial parallelism with the last supporting spindle 28, and the probe finger is normally held in the fully elevated position (shown in Fig. 1) by a tension spring 46, Fig. 3, exerting an upward force upon the wedge 40. From the foregoing it is apparent that the degree of leftward movement that may be imparted to the carriage 18, for operatively positioning the work in the machine, is directly limited by the distance that the rod 34 may be pushed, by engagement with the stop 32, inwardly of the carriage before its yielding movement is terminated by contact of the roller 36 with the inclined face 42 of the wedge. It is also apparent from the foregoing construction that lowering the position of the wedge 40 will effect a decrease in the amount the rod 34 can recede to the right, and consequently will similarly effect the amount of leftward positioning movement that can be imparted by the spring 24 to the carriage. Accordingly when a shoe last L, Fig. 3, provided as hereinbefore described with a probe hole H, is mounted upon the carriage 18, the probe 44 and wedge 40 will be forced downward, against the force of the spring 46, a given distance which, in each case, will depend upon the depth of the probe hole in that particular last. That is to say the spring 46 will be forced to yield when the upper end of the probe has penetrated to the bottom of the hole H. Since, in accordance with this invention, the depths of the probe holes in each of a series of lasts bear a definite relationship to the size characteristic of the respective lasts, the heightwise positions of the motion limiting wedge 40 will, in each case, vary in a ratio with the size of the last that is being supported upon the carriage preparatory to being operated upon by the machine tool.

The operation of the machine may be understood from the foregoing description but will be briefly summarized as follows: The operator gasps the handle 26 and pulls the carriage assembly toward the right, as shown in Fig. 1. With the carriage now in its last receiving position, and with the probe 44 held by the spring 46 fully elevated, the operator then places a last upon the carriage 18 with the spindle 28 in supporting engagement with the last mounting thimble and with the probe 44 extending upwards into the last hole H. As the bottom of the hole H engages the free end of the probe the further downward movement of the last toward its seated position upon the top of the carriage causes the probe to be depressed an amount that will vary in response to variations which may be encountered in the depths of the holes in different lasts. However, since in each case, the depth of the hole is determined in accordance with the size of the given last, the degree of downward movement that is imparted to the probe 44 upon mounting the last on the carriage will adjust the motion limiting wedge 40 at the proper heightwise position so as to regulate the degree of movement necessary to position the given last in the machine. With the wedge in adjusted location, the carriage assembly is then allowed to be drawn, by the spring 24, into operative position. During this movement of the carriage the outer or left end of the rod 34 first engages the fixed stop 32 and then yields inwardly of the carriage against the force of the light spring 38 until the relative yielding movement between the carriage and the rod 34 is terminated by engagement of the roller 36 against the face 42 of the wedge. The shoe is now in proper position with respect to the knife 14, and the operator may depress the foot treadle 16 to initiate the power operation of the machine. During the depression of the treadle 16, and before the knife 14 is tripped, a holddown plate P is lowered against the heel surface to clamp the last firmly upon the supporting carriage 18 preparatory to the chopping action of the knife.

Having thus described my invention, what I claim as new and desire to secure by Letters Patent of the United States is:

1. In a shoe machine, a device for automatically positioning shoes mounted upon lasts of different sizes at whatever location in the machine each shoe should assume when in proper alinement with the operating instrumentalities of the machine, each last having a probe hole the depth of which when tangibly sensed by the machine provides a coded index indicating the size characteristic which determines the correct operative position of the last and shoe with respect to said instrumentalities, said device comprising: a movable carriage for shifting a last and shoe mounted thereon from a loading station to the indicated operative position for that last and shoe;

and means defining limits of movement of the carriage including an axially movable probe finger slidably journaled in the carriage and adapted to enter and penetrate to the full depth of said probe hole.

2. In a shoe machine, a device as defined in claim 1, wherein said means include a movable abutment and wherein the degree of axial movement of the probe finger in penetrating the depth of the probe hole actuates the movable abutment for arresting the movement of said carriage.

3. In a shoe machine, a device as defined in claim 2, wherein said means include a sliding wedge connected to the axially movable probe finger for variably limiting the movement of the carriage in proportion to the depth of the hole in the last.

4. In a shoe machine, a device for automatically positioning shoes mounted upon lasts of different sizes at whatever location in the machine each shoe should assume when in proper alinement with the operating instrumentalities of the machine, each last having a probe hole the depth of which when tangibly sensed by the machine provides a coded index indicating the size characteristic which determines the correct operative position of the last and shoe with respect to said instrumentalities, said device comprising: a movable carriage for shifting a last and shoe mounted thereon from a loading station to the indicated operative position for that last and shoe; a guideway for directing movement of the carriage to said station in the machine; resilient means tending to urge the carriage along said guideway in a direction away from the loading station; a fixed abutment located in the path of said carriage; a probe finger movably mounted on the carriage and having a free end adapted to enter the probe hole of a mounted last; resilient means urging the end of the finger to penetrate to the depth of said hole; a sliding wedge having an angular face that is progressively displaced in response to the penetrating movement of said finger; and a second abutment member interposed between and engageable with said face and said fixed abutment.

5. In a machine, having a tool operatively located at a fixed station for performing operations on shoe parts that are assembled on shoe lasts of various sizes, and having a movable carriage upon which a last and shoe may be mounted and, by controlling movement of the carriage, may be automatically positioned regardless of the size of the particular last so that a particular portion of each of said parts is accurately presented to the operation of the tool at said station, the combination of: means for moving the carriage a determinable distance with respect to the tool; and size sensing mechanism responsive to a size characteristic of any last for determining the degree of movement to be imparted by said means operatively to position the last and shoe parts with respect to the tool, said sensing mechanism including a sliding wedge the angular face of which when displaced acts as a variable motion limiting abutment, and a probe element affixed to the wedge and extending in a direction so as to register with a probe hole drilled in the last to a depth indicative of the size characteristic of the particular last.

6. In a shoe machine, for performing an operation at an operating station in the machine upon shoe parts that are assembled on lasts of different sizes each of said lasts being provided at an accessible location with a recess having a depth that bears a coding ratio to a size characteristic of the particular last thereby providing an index for determining the correct operative position for each last in the machine so that regardless of size variations the shoe parts may be accurately presented at the operating station, the combination of: a work carriage having mounting means for supporting a last when loaded thereon; means, including a guide tending to urge the carriage and last in a direction from a loading station toward and beyond the operating station in the machine; an abutment member shiftably mounted on the carriage and engageable with a stop for variably limiting the movement of the carriage in said direction; a slidable wedge for shifting the abutment member relative to the carriage; a probe finger affixed to the wedge and extending therefrom in a direction so as to enter said recess in a loaded last; and resilient means urging said finger to penetrate the depth of the recess thereby controlling the position of the last and shoe parts with respect to the operating station.

7. In a shoe machine, having movable means upon which the work is mounted for presenting the work in proper orientation with respect to a tool operating station, the combination of: an automatically controlled motion limiting device operatively associated with said means to provide a variably shiftable abutment surface the engagement of which surface against a fixed stop operatively locates the work; said device comprising a sliding wedge member for determining the position of the abutment surface, a size sensing feeler movable integrally with the wedge member and adapted when a last is mounted on said movable means to enter and penetrate to the full depth of a hole formed in the last where in each last the depth of said hole is proportionate to a size characteristic of that last thereby to provide an index of the amount of movement required to be imparted to the movable means for properly positioning the work relative to the tool.

8. In a machine for operating on shoes of different sizes, said shoes being mounted on lasts of different sizes and each of said lasts having a hole drilled to a depth that is proportionate to the size of that particular last, the combination of: a movable carriage for variably positioning the lasts and shoes in the machine; a probe finger operable to probe the depth of the last hole; and means responsive to the operation of said finger for limiting the movement of the carriage in proportion to the depth of said hole.

9. In a shoe machine having a movable carriage for directly supporting a last and shoe thereon and for uniformly presenting every last and shoe regardless of size in proper alinement with the operating instrumentalities of the machine, the combination of: a shiftable abutment member in the form of a slidable wedge having an angular portion interposed between a portion of the carriage and a fixed motion limiting stop member for variably limiting the degree of movement that may be imparted to the carriage; and last size sensing means associated with the carriage for shifting the position of the wedge in accordance with a tangible size index provided on each last.

10. A shoe machine as defined in claim 9, wherein the size index is a probe hole having a depth indicative of the size characteristic of the particular last; and wherein the size sensing means is a probe finger movable concomitantly with the wedge and adapted to penetrate to the full depth of each probe hole.

11. In a shoe machine for operating on shoe parts assembled on a last, an operating instrumentality, a work support having means for mounting a last thereon, means for causing movement between the work support and the operating instrumentality to locate the last and shoe parts relative to said instrumentality, and an automatic motion limiting device for controlling the degree of relative movement imparted in accordance with the size of the last and shoe parts to be operated on, said device including a movable probe adapted to sense the size of each last by entering a probe hole formed in the lasts, the depth of the respective holes being graded as a ratio with the size of the respective lasts, and a motion limiting wedge slidable in response to the movement of said probe, whereby the adjustment of the wedge is automatically determined by the size of any last and shoe parts when presented to the machine.

12. In a shoe machine, a device for automatically positioning shoes mounted upon lasts of different sizes at whatever location in the machine each shoe should assume when in proper alinement with the operating instrumentalities of the machine, each last having a probe hole the depth of the bottom of which when tangibly sensed by the machine provides a coded index indicating the size characteristic which determines the correct operative position of the last and shoe with respect to said instrumentalities, said device comprising: a supporting carriage for the last movable from an inoperative position to advance the last and shoe thereon into operative relation to said machine; and means for limiting advancing movement of said carriage comprising a probe rod mounted for movement relatively to said carriage and in a direction axially of the probe hole of the last on said carriage, and shiftable mechanism positioned by said probe upon engagement of the probe with the bottom of said probe hole for limiting the advancing movement of said carriage when the last and shoe reach a relation with respect to the machine corresponding to the depth of the probe hole.

13. In a machine adapted to perform an operation upon a particular zone of a shoe mounted on a last, a device for operatively locating said zone regardless of variations in shoe size in operative relation to the machine, said device comprising: a movable supporting carriage for the last; a probe rod slidably mounted to project from the last engaging surface of said carriage and adapted to enter a probe hole drilled in the last to a depth indicative of the particular size of said last and shoe; and means, controlled by the degree of projection of the probe rod from said last engaging surface when the last is seated upon said surface and the probe rod is seated at the bottom of said hole, for determining the operative relation of said zone of the shoe and last with respect to the machine.

14. In a machine adapted to perform an operation upon a particular zone of a shoe mounted on a last, a device for operatively locating said zone regardless of variations in shoe size in operative relation to the machine, said device comprising: a movable supporting carriage for the last; a probe rod slidably mounted to project from the last engaging surface of said carriage and adapted to enter a probe hole drilled in the last to a depth indicative of the particular size of said last and shoe; and means, controlled by the extent of penetration by the probe rod into said last when the last is seated upon said surface and the probe rod is seated at the bottom of the hole, for determining the operative relation of said zone of the shoe and last with respect to the machine.

References Cited in the file of this patent

UNITED STATES PATENTS 1,218,148     Winkley  --------------- Mar. 6, 1917